US011059923B2

(12) United States Patent
Shi et al.

(10) Patent No.: US 11,059,923 B2
(45) Date of Patent: Jul. 13, 2021

(54) PREPARATION METHOD FOR HIGH-SOLID ACRYLIC RESIN

(71) Applicant: WUXI ACRYL TECHNOLOGY CO., LTD, Jiangsu (CN)

(72) Inventors: Ying Shi, Jiangsu (CN); Wenquan Zhang, Jiangsu (CN); Meng Zhu, Jiangsu (CN); Ping Pan, Jiangsu (CN); Yuanming Cong, Jiangsu (CN)

(73) Assignee: WUXI ACRYL TECHNOLOGY CO., LTD, Wuxi (CN)

( * ) Notice: Subject to any disclaimer, the term of this patent is extended or adjusted under 35 U.S.C. 154(b) by 172 days.

(21) Appl. No.: 16/489,928

(22) PCT Filed: Feb. 14, 2018

(86) PCT No.: PCT/CN2018/076795
§ 371 (c)(1),
(2) Date: Aug. 29, 2019

(87) PCT Pub. No.: WO2018/157747
PCT Pub. Date: Sep. 7, 2018

(65) Prior Publication Data
US 2019/0389990 A1 Dec. 26, 2019

(30) Foreign Application Priority Data

Mar. 1, 2017 (CN) .......................... 201710115685.8

(51) Int. Cl.
| | | |
|---|---|---|
| *C08F 2/06* | (2006.01) | |
| *C08F 220/06* | (2006.01) | |
| *C08F 220/12* | (2006.01) | |
| *C08F 220/18* | (2006.01) | |
| *C08F 220/20* | (2006.01) | |
| *C08F 220/14* | (2006.01) | |
| *C09D 133/06* | (2006.01) | |

(52) U.S. Cl.
CPC .......... *C08F 220/18* (2013.01); *C08F 220/14* (2013.01); *C09D 133/066* (2013.01); *C08F 2800/20* (2013.01)

(58) Field of Classification Search
CPC ........ C08F 2/06; C08F 220/06; C08F 220/12; C08F 220/20
See application file for complete search history.

(56) References Cited

U.S. PATENT DOCUMENTS

2007/0282049 A1    12/2007   Munzmay et al.

FOREIGN PATENT DOCUMENTS

| CN | 1278277 | | 12/2000 |
|---|---|---|---|
| CN | 101081957 | | 12/2007 |
| CN | 103102446 | | 5/2013 |
| CN | 103102446 A | * | 5/2013 |
| CN | 103998472 | | 8/2014 |
| CN | 105669892 | | 6/2016 |
| CN | 106752879 | | 5/2017 |

OTHER PUBLICATIONS

Computer-generated English-language translation of CN-103102446-A.*
International Search Report issued in PCT/CN2018/076795, dated Apr. 27, 2018.

* cited by examiner

*Primary Examiner* — Vu A Nguyen
(74) *Attorney, Agent, or Firm* — Barnes & Thornburg LLP; Jeffrey R. Stone

(57) ABSTRACT

Disclosed is a preparation method for a high-solid acrylic resin, comprising the following steps: preparing acrylic acid or methacrylic acid, an alkyl acrylate or alkyl methacrylate, styrene, hydroxyethyl acrylate or hydroxypropyl acrylate, an acrylate with a bridge ring structure, an initiator, and a solvent; adding the solvent to a reactor, stirring, and increasing the temperature to the boiling point temperature of the solvent; adding the reaction raw materials and the initiator from a dropping funnel and stirring, and after the completion of the addition, maintaining the boiling point temperature of the solvent and continuously stirring; and cooling and discharging after the reaction is finished. The Gardner-Holdt tube viscosity of the prepared acrylic resin is 15-25 S (25° C.), and the solid content is 70%-75%.

4 Claims, No Drawings

PREPARATION METHOD FOR HIGH-SOLID ACRYLIC RESIN

TECHNICAL FIELD

Disclosed herein is a preparation method of a high-solid acrylic resin that is mainly used in the fields of automobile coatings and home decoration coatings.

BACKGROUND

With the increasing attention of China to energy conservation and environment protection, the consumption tax has been collected on coating since February 2015, and meanwhile it is specially pointed out that the consumption tax would be exempted for the coating with a Volatile Organic Compound (VOC) content of lower than 420 g/L (inclusive) under construction conditions. This policy puts more stringent requirements on the entire coating industry. Because of low VOC content and good construction performance, the high-solid coating can reach the specified emission standard during the construction. Accordingly, the research and development of low-solvent type, high-solid, high-performance and low-cost coatings become the current development trend.

High-solid acrylic resin has excellent comprehensive performance, and particularly has unique superiority in aspects of weather resistance, gloss and paint film fullness, etc., and therefore has met with a favorable reception in the market and is one of the varieties that are developed rapidly in coating industry at present. To reduce the emission of VOC and increase the solid content of coatings, the viscosity of coating resin is obliged to be reduced as much as possible. Common measures comprise: reducing the molecular weight of the resin, reducing the glass transition temperature of the resin and adopting a reactive diluent. However, these measures have a disadvantage of lowering the coating performances, and are prone to damaging performances of coating films. In recent years, functional methacrylate monomer is increasingly popular with coating resin production enterprises, and it effectively reduces the viscosity and increases the solid content of resin while ensuring that performances thereof are not affected.

The preparation methods of high-solid low-viscosity acrylic resin reported in documents are achieved mainly by the addition of special functional monomers. For instance, Chinese patent No. CN104672366A suggests a method for synthesizing high-solid low-viscosity acrylic resin by employing glycidyl versatate (Cardura E-10) as a functional monomer, wherein 10-20 parts of glycidyl versatate is added, and the final acrylic resin has a solid content that can reach 70% and a viscosity of 3000-6000 mPa·s. Another type of functional monomer is alicyclic acrylate, wherein isobornyl (meth)acrylate and cyclohexyl (meth)acrylate are commonly used, among which isobornyl (meth)acrylate is a monomer with wider application and better viscosity reduction effect. For example, U.S. Pat. No. 6,069,203 describes a high-solid coating composition and a preparation method thereof, which comprises employing xylene as a solvent and di-tert-butyl peroxide as an initiator, adding monomers such as acrylic acid, hydroxyethyl methacrylate, styrene and isobornyl methacrylate thereinto, and obtaining a coating with a solid content of 50.0% or more.

Such types of functional monomers possess good viscosity reduction effect but nevertheless have limitations. For glycidyl versatate, with the growth of polymer chain segments during reaction, carboxyls existing on macromolecules are reduced in reactivity and thus can't fully react with epoxy groups in glycidyl versatate, which is prone to cause deteriorated water resistance and weather resistance, etc. of a resulting coating film, and glycidyl versatate is expensive, which greatly restricts further research and application thereof. The synthetic raw material of isobornyl (meth)acrylate monomers, i.e. camphene, is obtained by processing natural products, which is greatly influenced by yield and market discipline and thus the price thereof is high and fluctuates greatly.

SUMMARY

The following is a brief summary of the subject matter that is described in greater detail in this disclosure. The summary is not intended to limit the protection scope of the claims.

This disclosure aims to overcome the defects in the prior art and provide a preparation method of a high-solid acrylic resin such that the obtained product has low viscosity and good leveling property.

According to the technical solution provided by this disclosure, the preparation method of a high-solid acrylic resin comprises the following steps:

a. the following reaction materials are prepared: 0.2-2 parts by weight of acrylic acid or 0.2-2 parts by weight of methacrylic acid, 20-40 parts by weight of alkyl acrylate or 20-40 parts by weight of alkyl methacrylate, 0-25 parts by weight of styrene, 1.0-10.0 parts by weight of hydroxyethyl acrylate or 1.0-10.0 parts by weight of hydroxypropyl acrylate, and 10.0-50.0 parts by weight of acrylate with a bridged ring structure, and the chemical formula of the acrylate with a bridged ring structure is:

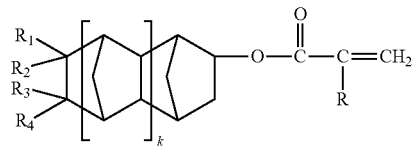

wherein, the groups R, $R_1$, $R_2$, $R_3$, $R_4$ are hydrogen or methyl, and the value of k is 0 or 1;

b. 0.5-2.0 parts by weight of a reaction initiator are prepared;

c. 25-30 parts by weight of a reaction solvent are prepared;

d. the solvent is fed into a reactor equipped with a mechanical stirrer, a thermometer, a reflux condenser tube, a temperature controller and a dropping funnel, stirred and warmed up to the boiling point temperature of the solvent;

e. the reactive raw materials and the initiator are fed into the dropping funnel, stirred, and added dropwise at a constant speed over 3-5 hours; after the completion of the addition, the temperature is maintained at the boiling point of the solvent and stirring is continued for 2-4 hours;

f. cooling and discharging are conducted after the reaction is finished.

As a preference, the initiator is benzoyl peroxide, azobisisobutyronitrile, tert-butyl peroxybenzoate, tert-butyl peroxy-2-ethylhexanoate, di-tert-butyl peroxide or di-tert-amyl peroxide.

As a preference, the solvent is toluene, xylene, ethylene glycol monobutyl ether acetate, propylene glycol methyl ether propionate, butyl acetate, cyclohexanone or n-butyl alcohol.

As a preference, the acrylate with a bridged ring structure is:

(01) 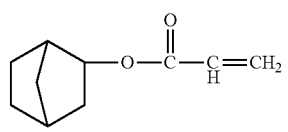
(02) 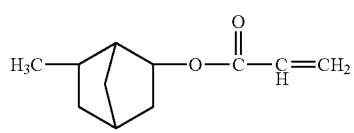
(03) 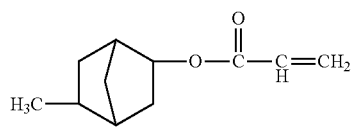
(04) 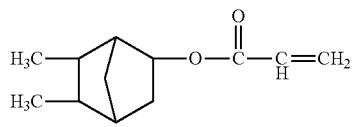
(05) 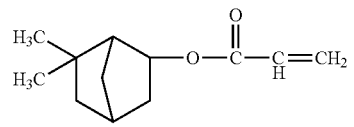
(06) 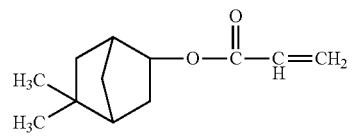
(07) 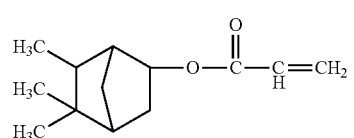
(08) 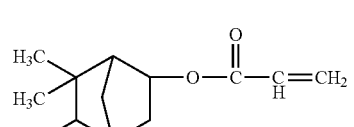
(09) 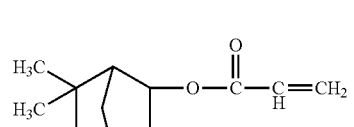
(10) 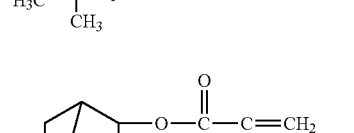
(11) 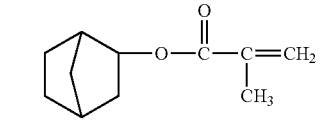
(12) 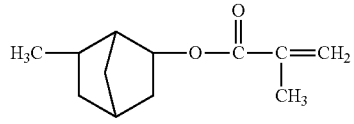
(13) 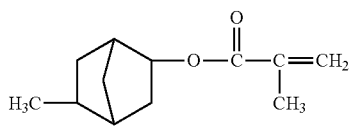
(14) 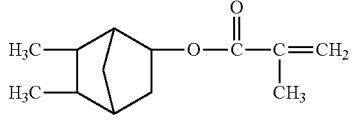
(15) 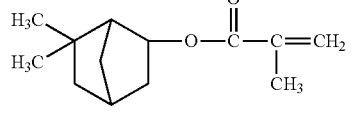
(16) 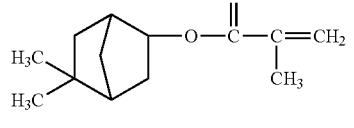
(17) 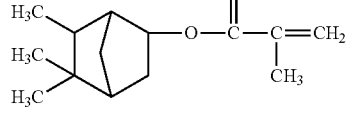
(18) 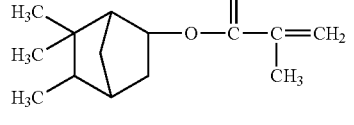
(19) 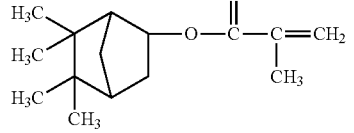
(20) 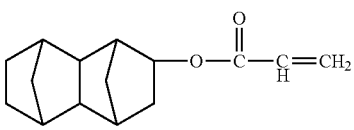
(21) 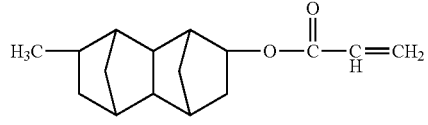
(22) 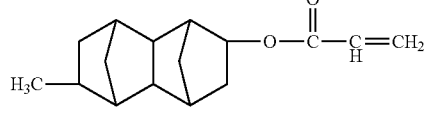

(23) 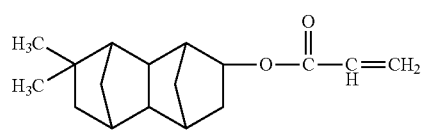

(24) 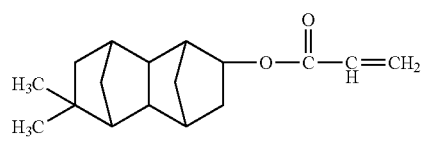

(25) 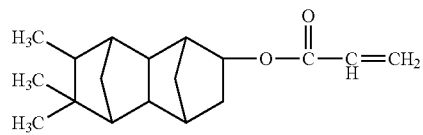

(26) 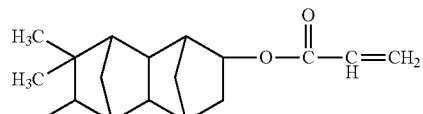

(27) 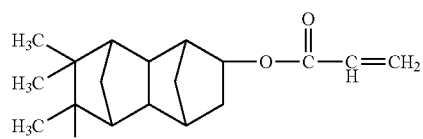

(28) 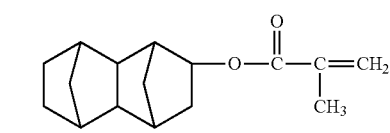

(29) 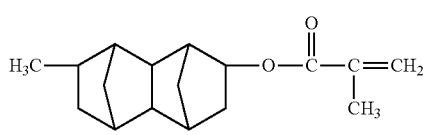

(30) 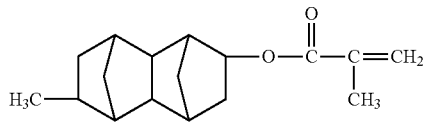

(31) 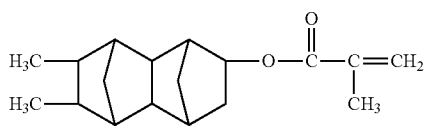

(32) 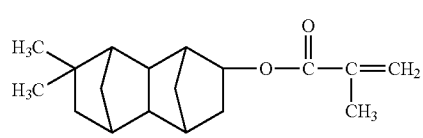

(33) 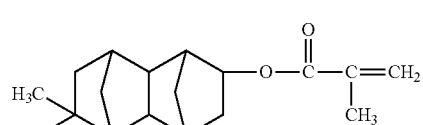

(34) 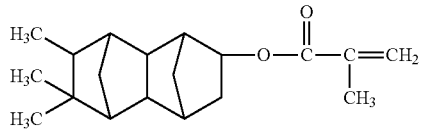

(35) 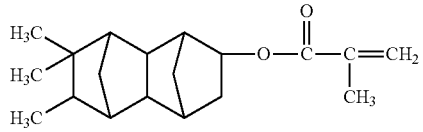

(36) 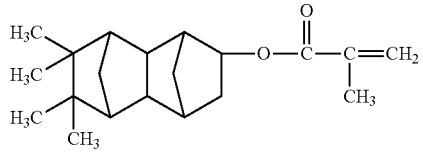

This disclosure employs an acrylate containing a bridged ring structure as a functional monomer in the preparation of high-solid acrylic resin, so that the resin viscosity can be effectively reduced and the solid content of resin can be increased. The prepared acrylic resin has a Gardner-Holdt tube viscosity of 15-25 S (25° C.) and a solid content of 70%-75%.

The acrylic resin of this disclosure possesses low viscosity, easy construction, good leveling property, high gloss, excellent distinctness of image and good fullness of paint film.

DETAILED DESCRIPTION

The technical solutions of this disclosure are further explained by combining specific embodiments.

Example 1

Raw materials for preparing a high-solid acrylic resin were prepared according to a formula with the following components in parts by weight:
acrylic acid: 2.0 parts
isooctyl acrylate: 2.0 parts;
methyl methacrylate: 12.0 parts;
n-butyl methacrylate: 12.0 parts;
hydroxypropyl acrylate: 10.0 parts;

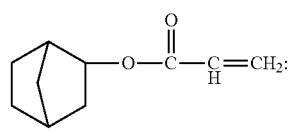

30.0 parts;
and 2.0 parts of tert-butyl peroxybenzoate was prepared as a reaction initiator; 30.0 parts of toluene was prepared as a reaction solvent.

A high-solid acrylic resin was prepared according to the following steps:
the solvent toluene was fed into a reactor equipped with a mechanical stirrer, a thermometer, a reflux condenser tube, a temperature controller and a dropping funnel, stirred and warmed up to reflux temperature (i.e., the boiling point temperature of toluene);

the raw materials and the initiator in the aforementioned proportion were fed into the dropping funnel, stirred, and added dropwise at a constant speed over 3 hours; after the completion of the addition, the reflux temperature was maintained and stirring was continued for 2 hours;
cooling and discharging were conducted after the reaction was finished.

The acrylic resin prepared in this example has a Gardner-Holdt tube viscosity of 17S (25° C.) and a solid content of 70.0% according to related tests.

Desmodur N-3390 was employed as a curing agent to prepare a paint with the high-solid acrylic resin prepared in Example 1 in a molar ratio of OH:NCO=1:1, with performances of paint film shown in Table 1.

Example 2

Raw materials for preparing a high-solid acrylic resin were prepared according to a formula with the following components in parts by weight:
methacrylic acid: 0.2 parts;
n-octyl acrylate: 2.0 parts;
ethyl methacrylate: 12.0 parts;
isopropyl methacrylate: 26.0 parts;
styrene: 5.0 parts;
hydroxyethyl acrylate: 2.0 parts;

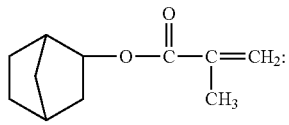

26.8 parts;
and 1.0 part of tert-butyl peroxy-2-ethylhexanoate was prepared as a reaction initiator;
25.0 parts of xylene was prepared as a reaction solvent.

A high-solid acrylic resin was prepared according to the following steps:
the solvent xylene was fed into a reactor equipped with a mechanical stirrer, a thermometer, a reflux condenser tube, a temperature controller and a dropping funnel, stirred and warmed up to reflux temperature (i.e., the boiling point temperature of xylene);
the raw materials and the initiator in the aforementioned proportion were fed into the dropping funnel, stirred, and added dropwise at a constant speed over 5 hours; after the completion of the addition, the reflux temperature was maintained and stirring was continued for 3 hours;
cooling and discharging were conducted after the reaction was finished.

The acrylic resin prepared in this example has a Gardner-Holdt tube viscosity of 20 S (25° C.) and a solid content of 75.0% according to related tests.

Desmodur N-3390 was employed as a curing agent to prepare a paint with the high-solid acrylic resin prepared in Example 2 in a molar ratio of OH:NCO=1:1, with performances of paint film shown in Table 1.

Example 3

Raw materials for preparing a high-solid acrylic resin were prepared according to a formula with the following components in parts by weight:
acrylic acid: 1.0 part
methyl methacrylate: 8.0 parts;
isobutyl methacrylate: 8.0 parts;
ethyl acrylate: 4.0 parts;
styrene: 2.0 parts;
hydroxypropyl acrylate: 1.0 part;

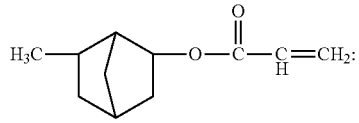

50.0 parts;
and 1.0 part of di-tert-butyl peroxide was prepared as a reaction initiator;
25.0 parts of ethylene glycol monobutyl ether acetate was prepared as a reaction solvent.

A high-solid acrylic resin was prepared according to the following steps:
the solvent ethylene glycol monobutyl ether acetate was fed into a reactor equipped with a mechanical stirrer, a thermometer, a reflux condenser tube, a temperature controller and a dropping funnel, stirred and warmed up to reflux temperature (i.e., the boiling point temperature of ethylene glycol monobutyl ether acetate);
the raw materials and the initiator in the aforementioned proportion were fed into the dropping funnel, stirred, and added dropwise at a constant speed over 4 hours; after the completion of the addition, the reflux temperature was maintained and stirring was continued for 4 hours;
cooling and discharging were conducted after the reaction was finished.

The acrylic resin prepared in this example has a Gardner-Holdt tube viscosity of 15 S (25° C.) and a solid content of 75.0% according to related tests.

Desmodur N-3390 was employed as a curing agent to prepare a paint with the high-solid acrylic resin prepared in Example 3 in a molar ratio of OH:NCO=1:1, with performances of paint film shown in Table 1.

Example 4

A high-solid acrylic resin was prepared from the following components in parts by weight according to a formula:
methacrylic acid: 1.5 parts;
methyl acrylate: 11.0 parts;
methyl methacrylate: 10.0 parts;
hexyl methacrylate: 9.0 parts;
styrene: 25.0 parts;
hydroxyethyl acrylate: 5.0 parts;

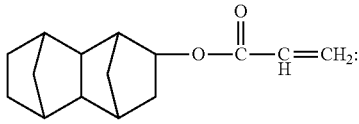

10.0 parts;
and 1.5 parts of di-tert-amyl peroxide was prepared as a reaction initiator; 27.0 parts of propylene glycol methyl ether propionate was prepared as a reaction solvent.

A high-solid acrylic resin was prepared according to the following steps:
the solvent propylene glycol methyl ether propionate was fed into a reactor equipped with a mechanical stirrer, a thermometer, a reflux condenser tube, a temperature controller and a dropping funnel, stirred and warmed up to reflux temperature (i.e., the boiling point temperature of propylene glycol methyl ether propionate);
the raw materials and the initiator in the aforementioned proportion were fed into the dropping funnel, stirred, and added dropwise at a constant speed over 3 hours; after the completion of the addition, the reflux temperature was maintained and the stirring was continued for 4 hours;
cooling and discharging were conducted after the reaction was finished.

The acrylic resin prepared in this example has a Gardner-Holdt tube viscosity of 22 S (25° C.) and a solid content of 72.5% according to related tests.

Desmodur N-3390 was employed as a curing agent to prepare a paint with the high-solid acrylic resin prepared in Example 4 in a molar ratio of OH:NCO=1:1, with performances of paint film shown in Table 1.

Example 5

Raw materials for preparing a high-solid acrylic resin were prepared according to a formula with the following components in parts by weight:
acrylic acid: 1.0 part
n-butyl acrylate: 15.0 parts;
ethyl methacrylate: 16.0 parts;
butyl methacrylate: 8.0 parts;
styrene: 4.0 parts;
hydroxypropyl acrylate: 2.0 parts;

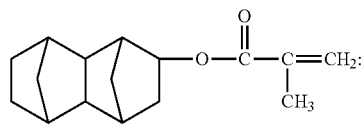

22.0 parts;
and 2.0 parts of benzoyl peroxide was prepared as a reaction initiator;
30.0 parts of butyl acetate was prepared as a reaction solvent.

A high-solid acrylic resin was prepared according to the following steps:
the solvent butyl acetate was added into a reactor equipped with a mechanical stirrer, a thermometer, a reflux condenser tube, a temperature controller and a dropping funnel, stirred and warmed up to reflux temperature (i.e., the boiling point temperature of butyl acetate);
the raw materials and the initiator in the aforementioned proportion were fed into the dropping funnel, stirred, and added dropwise at a constant speed over 3 hours; after the completion of the addition, the reflux temperature was maintained and stirring was continued for 4 hours;
cooling and discharging were conducted after the reaction was finished.

The acrylic resin prepared in this example has a Gardner-Holdt tube viscosity of 15 S (25° C.) and a solid content of 70.5% according to related tests.

Desmodur N-3390 was employed as a curing agent to prepare a paint with the high-solid acrylic resin prepared in Example 5 in a molar ratio of OH:NCO=1:1, with performances of paint film shown in Table 1.

Example 6

Raw materials for preparing a high-solid acrylic resin were prepared according to a formula with the following components in parts by weight:
acrylic acid: 1.0 part
isobutyl acrylate: 4.0 parts;
methyl methacrylate: 12.0 parts;
isopropyl methacrylate: 10.0 parts;
styrene: 8.0 parts;
hydroxypropyl acrylate: 3.0 parts;

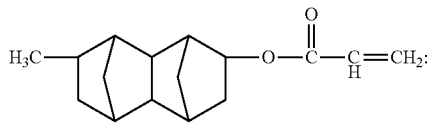

30.0 parts of cyclohexanone was prepared as a reaction solvent.

A high-solid acrylic resin was prepared according to the following steps:
the solvent cyclohexanone was fed into a reactor equipped with a mechanical stirrer, a thermometer, a reflux condenser tube, a temperature controller and a dropping funnel, stirred and warmed up to reflux temperature (i.e., the boiling point temperature of cyclohexanone);
the raw materials and the initiator in the aforementioned proportion were fed into the dropping funnel, stirred, and added dropwise at a constant speed over 5 hours; after the completion of the addition, the reflux temperature was maintained and stirring was continued for 4 hours;
cooling and discharging were conducted after the reaction was finished.

The acrylic resin prepared in this example has a Gardner-Holdt tube viscosity of 25 S (25° C.) and a solid content of 70.0% according to related tests.

Desmodur N-3390 was employed as a curing agent to prepare a paint with the high-solid acrylic resin prepared in Example 6 in a molar ratio of OH:NCO=1:1, with performances of paint film shown in Table 1.

Example 7

Raw materials for preparing a high-solid acrylic resin were prepared according to a formula with the following components in parts by weight:
acrylic acid: 1.0 part
methyl acrylate: 7.0 parts;
isooctyl acrylate: 4.0 parts;
methyl methacrylate: 15.0 parts;
styrene: 10.0 parts;
hydroxyethyl acrylate: 1.0 part;

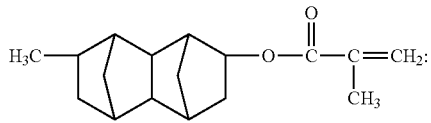

30.0 parts;
and 2.0 parts of tert-butyl peroxybenzoate was prepared as a reaction initiator;
30.0 parts of n-butyl alcohol was prepared as a reaction solvent.

A high-solid acrylic resin was prepared according to the following steps:
the solvent n-butyl alcohol was fed into a reactor equipped with a mechanical stirrer, a thermometer, a reflux condenser tube, a temperature controller and a dropping funnel, stirred and warmed up to reflux temperature (i.e., the boiling point temperature of n-butyl alcohol);
the raw materials and the initiator in the aforementioned proportion were fed into the dropping funnel, stirred, and added dropwise at a constant speed over 3 hours; after the completion of the addition, the reflux temperature was maintained and stirring was continued for 2 hours;
cooling and discharging were conducted after the reaction was finished.

The acrylic resin prepared in this example has a Gardner-Holdt tube viscosity of 18 S (25° C.) and a solid content of 70.0% according to related tests.

Desmodur N-3390 was employed as a curing agent to prepare a paint with the high-solid acrylic resin prepared in Example 7 in a molar ratio of OH:NCO=1:1, with performances of paint film shown in Table 1.

Example 8

Raw materials for preparing a high-solid acrylic resin were prepared according to a formula with the following components in parts by weight:
methacrylic acid: 1.5 parts;
n-octyl acrylate: 4.0 parts;
ethyl methacrylate: 17.0 parts;
isooctyl methacrylate: 12.0 parts;
styrene: 2.0 parts;
hydroxypropyl acrylate: 2.0 parts;

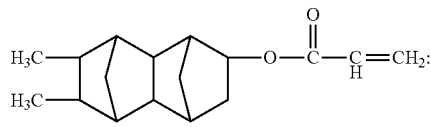

15.0 parts

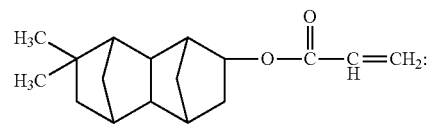

15.0 parts;
and 1.5 parts of di-tert-butyl peroxide was prepared as a reaction initiator;
30.0 parts of xylene was prepared as a reaction solvent.

A high-solid acrylic resin was prepared according to the following steps:
the solvent xylene was fed into a reactor equipped with a mechanical stirrer, a thermometer, a reflux condenser tube, a temperature controller and a dropping funnel, stirred and warmed up to reflux temperature (i.e., the boiling point temperature of xylene);
the raw materials and the initiator in the aforementioned proportion were fed into the dropping funnel, stirred, and added dropwise at a constant speed over 3 hours; and after the completion of the addition, the reflux temperature was maintained and stirring was continued for 3 hours;
cooling and discharging were conducted after the reaction was finished.

The acrylic resin prepared in this example has a Gardner-Holdt tube viscosity of 22 S (25° C.) and a solid content of 70.5% according to related tests.

Desmodur N-3390 was employed as a curing agent to prepare a paint with the high-solid acrylic resin prepared in Example 8 in a molar ratio of OH:NCO=1:1, with performances of the paint film shown in Table 1.

Example 9

Raw materials for preparing a high-solid acrylic resin were prepared according to a formula with the following components in parts by weight:
acrylic acid: 1.5 parts
methyl methacrylate: 21.5 parts;
isooctyl acrylate: 5.0 parts;
styrene: 10.0 parts;
hydroxypropyl acrylate: 5.0 parts;

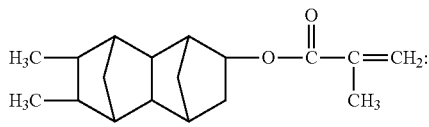

15.0 parts;

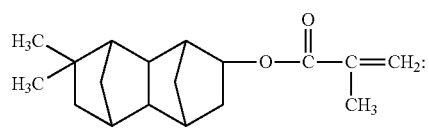

15.0 parts;
and 2.0 parts of di-tert-amyl peroxide was prepared as a reaction initiator;
25.0 parts of xylene was prepared as a reaction solvent.

A high-solid acrylic resin was prepared according to the following steps:
the solvent xylene was fed into a reactor equipped with a mechanical stirrer, a thermometer, a reflux condenser tube, a temperature controller and a dropping funnel, stirred and warmed up to reflux temperature (i.e., the boiling point temperature of xylene);
the raw materials and the initiator in the aforementioned proportion were fed into the dropping funnel, stirred, and added dropwise at a constant speed over 4 hours; after the completion of the addition, the reflux temperature was maintained and stirring was continued for 4 hours;
cooling and discharging were conducted after the reaction was finished.

The acrylic resin prepared in this example has a Gardner-Holdt tube viscosity of 25 S (25° C.) and a solid content of 74.8% according to related tests.

Desmodur N-3390 was employed as a curing agent to prepare a paint with the high-solid acrylic resin prepared in Example 9 in a molar ratio of OH:NCO=1:1, with performances of paint film shown in Table 1.

Example 10

Raw materials for preparing a high-solid acrylic resin were prepared according to a formula with the following components in parts by weight:
acrylic acid: 1.0 part
isobutyl acrylate: 4.0 parts;
n-octyl acrylate: 5.0 parts;
methyl methacrylate: 15.0 parts;

isobutyl methacrylate: 12.0 parts;
hydroxypropyl acrylate: 10.0 parts;

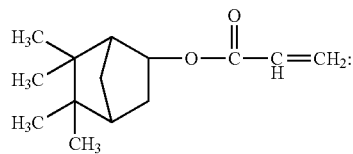

25.0 parts;
and 2.0 parts of tert-butyl peroxybenzoate was prepared as a reaction initiator; 26.0 parts of xylene was prepared as a reaction solvent.

A high-solid acrylic resin was prepared according to the following steps:
the solvent xylene was fed into a reactor equipped with a mechanical stirrer, a thermometer, a reflux condenser tube, a temperature controller and a dropping funnel, stirred and warmed up to reflux temperature (i.e., the boiling point temperature of xylene);
the raw materials and the initiator in the aforementioned proportion were fed into the dropping funnel, stirred, and added dropwise at a constant speed over 4 hours; after the completion of the addition, the reflux temperature was maintained and stirring was continued for 4 hours;
cooling and discharging were conducted after the reaction was finished.

The acrylic resin prepared in this example has a Gardner-Holdt tube viscosity of 20 S (25° C.) and a solid content of 73.5% according to related tests.

Desmodur N-3390 was employed as a curing agent to prepare a paint with the high-solid acrylic resin prepared in Example 10 in a molar ratio of OH:NCO=1:1, with performances of paint film shown in Table 1.

Comparison Example 1

Raw materials for preparing a high-solid acrylic resin were prepared according to a formula with the following components in parts by weight:
acrylic acid: 1.0 part
methyl methacrylate: 18.0 parts;
n-butyl methacrylate: 12.0 parts;
isooctyl acrylate: 4.0 parts;
hydroxypropyl acrylate: 10.0 parts;
styrene: 23.0 parts;
and 2.0 parts of tert-butyl peroxy-2-ethylhexanoate was prepared as a reaction initiator;
30.0 parts of toluene was prepared as a reaction solvent.

A high-solid acrylic resin was prepared according to the following steps:
the solvent toluene was fed into a reactor equipped with a mechanical stirrer, a thermometer, a reflux condenser tube, a temperature controller and a dropping funnel, stirred and warmed up to reflux temperature (i.e., the boiling point temperature of toluene);
the raw materials and the initiator in the aforementioned proportion were fed into the dropping funnel, stirred, and added dropwise at a constant speed over 4 hours, and after the completion of the addition, the reflux temperature was maintained and stirring was continued for 2 hours;
cooling and discharging were conducted after the reaction was finished.

The acrylic resin prepared in this comparison example has a Gardner-Holdt tube viscosity of 65 S (25° C.) and a solid content of 70.8% according to related tests. Desmodur N-3390 was employed as a curing agent to prepare a paint with the high-solid acrylic resin prepared in this comparison example in a molar ratio of OH:NCO=1:1, with performances of paint film shown in Table 1.

Comparison Example 2

Raw materials for preparing a high-solid acrylic resin were prepared according to a formula with the following components in parts by weight:
acrylic acid: 1.0 part
methyl methacrylate: 18.0 parts;
n-butyl methacrylate: 12.0 parts;
isooctyl acrylate: 4.0 parts;
hydroxypropyl acrylate: 10.0 parts;
isobornyl methacrylate: 23.0 parts;
and 2.0 parts of tert-butyl peroxy-2-ethylhexanoate was prepared as a reaction initiator;
30.0 parts of toluene was prepared as a reaction solvent.

A high-solid acrylic resin was prepared according to the following steps:
the solvent toluene was fed into a reactor equipped with a mechanical stirrer, a thermometer, a reflux condenser tube, a temperature controller and a dropping funnel, stirred and warmed up to reflux temperature (i.e., the boiling point temperature of toluene);
the raw reactive monomers and the initiator in the aforementioned proportion were fed into the dropping funnel, stirred, and added dropwise at a constant speed over 4 hours; and after the completion of the addition, the reflux temperature was maintained and stirring was continued for 2 hours;
cooling and discharging were conducted after the reaction was finished.

The acrylic resin prepared in this comparison example has a Gardner-Holdt tube viscosity of 20 S (25° C.) and a solid content of 71.0% according to related tests. Desmodur N-3390 was employed as a curing agent to prepare a paint with the high-solid acrylic resin prepared in Comparison Example 2 in a molar ratio of OH:NCO=1:1, with performances of paint film shown in Table 1.

TABLE 1

Performances of paint films according to various examples

| Experiment No. | Gloss (60°) | Distinctness of image DOI | Weather resistance (QVB accelerated aging test, h) | Resin compatibility | | | |
| --- | --- | --- | --- | --- | --- | --- | --- |
| | | | | Polyester resin | Alkyd resin | Epoxy resin | Acrylic resin |
| Example 1 | 96.0 | ○ | >500 | Δ | Δ | Δ | ○ |
| Example 2 | 95.8 | ○ | >500 | Δ | Δ | Δ | ○ |
| Example 3 | 97.0 | ○ | >500 | Δ | Δ | Δ | ○ |

TABLE 1-continued

Performances of paint films according to various examples

| Experiment No. | Gloss (60°) | Distinctness of image DOI | Weather resistance (QVB accelerated aging test, h) | Resin compatibility | | | |
|---|---|---|---|---|---|---|---|
| | | | | Polyester resin | Alkyd resin | Epoxy resin | Acrylic resin |
| Example 4 | 97.5 | ○ | >500 | Δ | Δ | Δ | ○ |
| Example 5 | 96.8 | ○ | >500 | Δ | Δ | Δ | ○ |
| Example 6 | 98.0 | ○ | >500 | Δ | Δ | Δ | ○ |
| Example 7 | 96.5 | ○ | >500 | Δ | Δ | Δ | ○ |
| Example 8 | 97.2 | ○ | >500 | Δ | Δ | Δ | ○ |
| Example 9 | 97.8 | ○ | >500 | Δ | Δ | Δ | ○ |
| Example 10 | 96.9 | ○ | >500 | Δ | Δ | Δ | ○ |
| Comparison Example 1 | 93 | X | <300 | X | X | X | ○ |
| Comparison Example 2 | 96.0 | Δ | >500 | Δ | Δ | Δ | ○ |

Notes:
X—poor, Δ—good, ○—excellent.

What is claimed is:

1. A preparation method of a high-solid acrylic resin, comprising the following steps:
   a. the following reaction materials are prepared: 0.2-2 parts by weight of acrylic acid or 0.2-2 parts by weight of methacrylic acid, 20-40 parts by weight of alkyl acrylate or 20-40 parts by weight of alkyl methacrylate, 0-25 parts by weight of styrene, 1.0-10.0 parts by weight of hydroxyethyl acrylate or 1.0-10.0 parts by weight of hydroxypropyl acrylate, and 10.0-50.0 parts by weight of acrylate with a bridged ring structure, and the chemical formula of the acrylate with a bridged ring structure is:

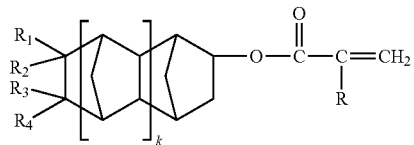

wherein, the groups R, $R_1$, $R_2$, $R_3$, $R_4$ are hydrogen or methyl, and the value of k is 0 or 1;
   b. 0.5-2.0 parts by weight of a reaction initiator are prepared;
   c. 25-30 parts by weight of a reaction solvent are prepared;
   d. the solvent is fed into a reactor equipped with a mechanical stirrer, a thermometer, a reflux condenser tube, a temperature controller and a dropping funnel, stirred and warmed up to the boiling point temperature of the solvent;
   e. the reaction materials and the initiator are fed into the dropping funnel, stirred, and added dropwise at a constant speed over 3-5 hours; after the completion of the addition, the temperature is maintained at the boiling point of the solvent and stirring is continued for 2-4 hours;
   f. cooling and discharging are conducted after the reaction is finished.

2. The preparation method of a high-solid acrylic resin according to claim 1, wherein the initiator is benzoyl peroxide, azobisisobutyronitrile, tert-butyl peroxybenzoate, tert-butyl peroxy-2-ethylhexanoate, di-tert-butyl peroxide or di-tert-amyl peroxide.

3. The preparation method of a high-solid acrylic resin according to claim 1, wherein the solvent is toluene, xylene, ethylene glycol monobutyl ether acetate, propylene glycol methyl ether propionate, butyl acetate, cyclohexanone or n-butyl alcohol.

4. The preparation method of a high-solid acrylic resin according to claim 1, wherein the acrylate with a bridged ring structure is:

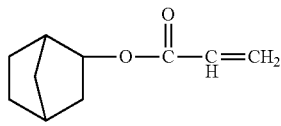

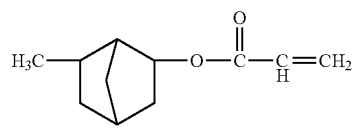

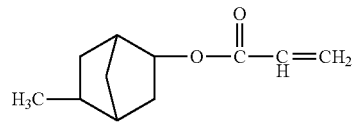

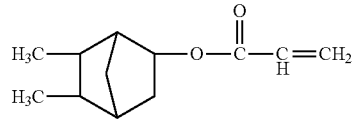

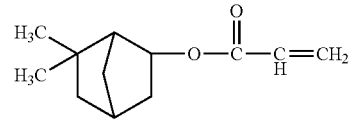

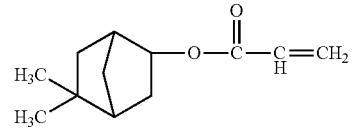

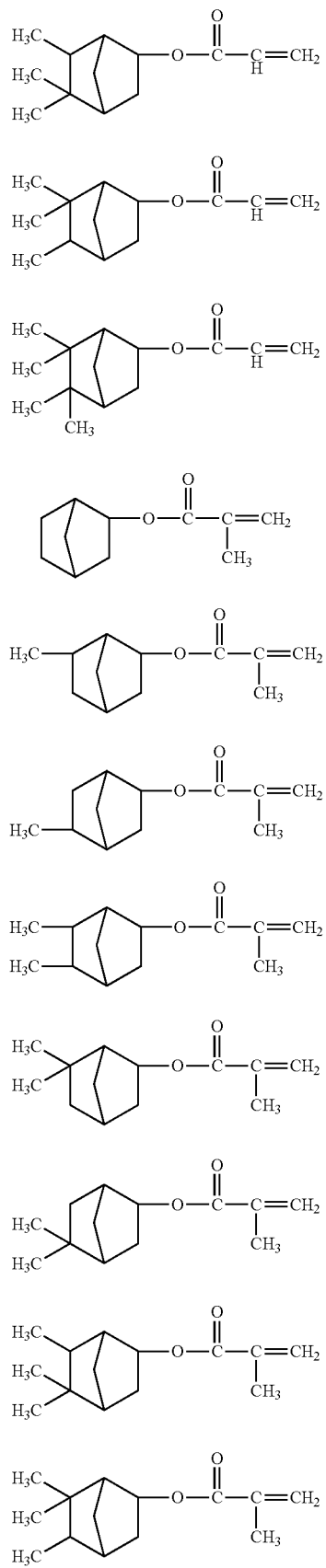

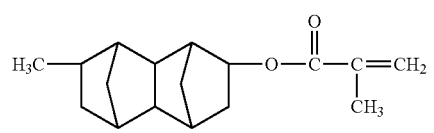
(29)
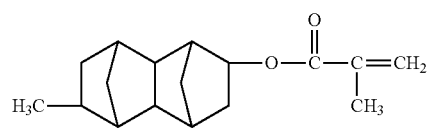
(30)
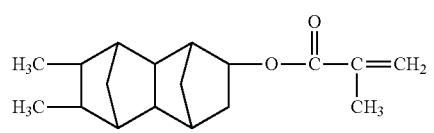
(31)
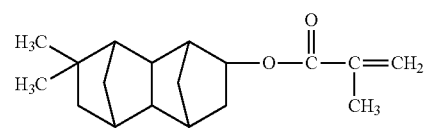
(32)
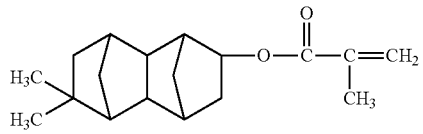
(33)
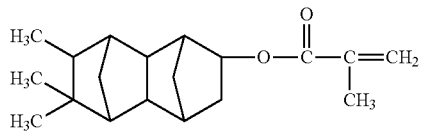
(34)
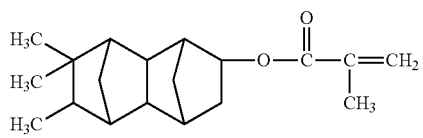
(35)
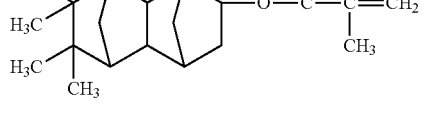
(36)
* * * * *